US012597984B2

(12) United States Patent
Jaldén et al.

(10) Patent No.: US 12,597,984 B2
(45) Date of Patent: Apr. 7, 2026

(54) METHODS, APPARATUS AND MACHINE-READABLE MEDIA RELATING TO CHANNEL ESTIMATION

(71) Applicant: Telefonaktiebolaget LM Ericsson (publ), Stockholm (SE)

(72) Inventors: Niklas Jaldén, Enköping (SE); Henrik Asplund, Stockholm (SE); Magnus Thurfjell, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 18/565,344

(22) PCT Filed: Jun. 11, 2021

(86) PCT No.: PCT/SE2021/050563
§ 371 (c)(1),
(2) Date: Nov. 29, 2023

(87) PCT Pub. No.: WO2022/260563
PCT Pub. Date: Dec. 15, 2022

(65) Prior Publication Data
US 2024/0291551 A1 Aug. 29, 2024

(51) Int. Cl.
*H04B 7/08* (2006.01)
*H04B 7/06* (2006.01)
*H04L 25/02* (2006.01)

(52) U.S. Cl.
CPC ........... *H04B 7/088* (2013.01); *H04B 7/0626* (2013.01); *H04L 25/0224* (2013.01)

(58) Field of Classification Search
CPC ... H04B 7/088; H04B 7/0626; H04L 25/0224; H04L 25/0256
See application file for complete search history.

(56) References Cited

U.S. PATENT DOCUMENTS

| | | | | |
|---|---|---|---|---|
| 6,205,193 B1* | 3/2001 | Solve | .................... | H04W 48/20 370/510 |
| 2020/0304233 A1* | 9/2020 | Garcia | .................. | H04W 28/12 |
| 2021/0135742 A1* | 5/2021 | Garcia | ............... | H04B 7/06952 |

FOREIGN PATENT DOCUMENTS

WO 2020126039 A1 6/2020

OTHER PUBLICATIONS

International Search Report and Written Opinion of the International Searching Authority, PCT/SE2021/050563, mailed Mar. 10, 2022, 11 pages.

(Continued)

*Primary Examiner* — Hashim S Bhatti
(74) *Attorney, Agent, or Firm* — Sage Patent Group

(57) ABSTRACT
One aspect of the disclosure provides a method for estimating a radio channel between a base station and a wireless device. The base station includes an antenna system which is configurable to utilize beam space processing for receiving radio transmissions. The method includes: using the antenna system to detect wireless energy from the wireless device in a plurality of beam directions; obtaining historical data relating to a likelihood that wireless energy in the plurality of beam directions contains channel information; selecting a subset of the plurality of beam directions based on the detected wireless energy and the historical data; and processing wireless energy detected in the subset of beam directions to estimate a channel between the base station and the wireless device.

15 Claims, 6 Drawing Sheets

(56) References Cited

OTHER PUBLICATIONS

Takahashi, Takumi et al., "Low-complexity Beam-domain Channel Estimation with Long-term Statistics for Large MIMO Detection," 2019 IEEE Global Communications Conference (Globecom), Dec. 9, 2019, 6 pages.

Bychkov, Roman et al., "Data-Driven Beams Selection for Beamspace Channel Estimation in Massive MIMO," 2021 IEEE 93rd Vehicular Technology Conference, Apr. 25, 2021, 5 pages.

* cited by examiner

604 — Memory

602 — Processing circuitry

606 — Interface(s)

600

702 — Using unit

704 — Obtaining unit

706 — Selecting unit

708 — Processing unit

700

METHODS, APPARATUS AND MACHINE-READABLE MEDIA RELATING TO CHANNEL ESTIMATION

CROSS REFERENCE TO RELATED APPLICATIONS

This application is a 35 U.S.C. § 371 national stage application of PCT International Application No. PCT/SE2021/050563 filed on Jun. 11, 2021, the disclosure and content of which is incorporated by reference herein in its entirety.

TECHNICAL FIELD

Embodiments of the disclosure relate to channel estimation for radio communication, and particularly to methods, apparatus and machine-readable media for channel estimation in a base station having an antenna system utilizing beam space processing for receiving radio transmissions.

BACKGROUND

Current and future wireless systems (for example New Radio (NR) and evolutions of Long Term Evolution (LTE)) are expected to provide ubiquitous high data-rate coverage. Achieving this requires an efficient use of the available resources. Conventionally, such resources include time, transmission frequencies and orthogonal coding schemes.

Increasingly, however, spatial resources are being employed through techniques such as beamforming. With multiple antennas at the transmitter and/or the receiver, it is possible to exploit the spatial degrees of freedom offered by multipath fading inside a wireless channel in order to provide a substantial increase in the data rates and reliability of wireless transmission. In the downlink, there are three basic approaches for utilizing the antenna: diversity, multiplexing and beamforming. In light of this, a greater number of antenna elements are being utilized at both the transmitter and receiver in present and future wireless standards such as LTE and NR.

With beamforming, the radiation pattern of the antennas may be controlled by transmitting a signal from a plurality of elements with element-specific gains and/or phases. In this way, radiation patterns may be created with different pointing directions and beam widths in both elevation and azimuth directions (depending on the structure of the array).

In order to know how to transmit (beamform) data to each specific user, the transmitter needs information of the radio channel, so-called channel state information (CSI). Most devices rely on reports from the receiver (e.g., the user equipment (UE) in downlink transmissions) indicating preferred directions to beamform in. To limit the amount of information needed to be sent by the receiver to the transmitter (e.g., the base station in downlink) standardized codebooks are commonly used. These codebooks contain a limited set of predefined beams (combinations of element-specific gains, phases, etc, known as codewords) that are expected to provide a good performance on average. However, it is unlikely that any of the codewords in a codebook will be the optimal beamforming method for a particular UE at a particular time.

The larger the antenna arrays become, the larger the codebooks need to be, which increases the overhead in feedback needed from the receiver to indicate appropriate downlink beamforming. An alternative solution to CSI feedback from the UE is to have the UE transmit a known sequence (e.g., sounding reference signals) which enables the base station to estimate the channel conditions. This is an attractive solution in time-division duplex (TDD) systems where the uplink and downlink transmissions utilize the same transmission frequencies. The wireless channel is reciprocal and thus, by adjusting for potential non-reciprocal aspects of the hardware, the uplink channel estimates provide information on how to beamform in the downlink. This solution is also tractable when large antenna arrays are used at the base station, since the sounding overhead does not increase with increasing transmitter array size (as opposed to codebook-based techniques).

In order for the base station to get high quality channel information, a good channel estimation algorithm is needed as well as a sufficiently high signal to noise ratio (SNR) in the uplink. To improve the uplink SNR, one promising solution is to perform the channel estimation using a linear combination of all receiver ports (i.e., all possible beam directions), so-called beam space processing.

Even with beam space processing, however, it has been found that the uplink SNR is often too low for several UEs to provide accurate channel information for reliable downlink beamforming.

SUMMARY

It is an object of embodiments of the disclosure to provide methods, apparatus and machine-readable media which enable or improve the estimation of a wireless channel. It will be understood by those skilled in the art that the term "channel" herein, unless otherwise stated, is used to refer to the effect of the transmission medium on radio transmissions between wireless devices and the base station; that is, where the signal received by the base station in the absence of any other transmissions, corresponds generally to the transmitted signal multiplied by a channel matrix (referred to herein as the "channel"), plus some noise.

From measurement logs collected in live networks, it has been found that only a subset of the spatial directions is likely to carry channel information for any given link between a transmitting device and a receiving device. That is, for each connection between a transmitting device (e.g., a UE) and a receiving device (e.g., a base station), all possible spatial directions will contain some wireless energy; however, only a subset of the possible spatial directions is likely to contain wireless energy transmitted by the transmitting device (as well as some noise), and thus carry information as to the channel between the transmitting device and the receiving device. Other spatial directions are likely to contain only noise.

One potential method of improving the uplink channel estimation is therefore to estimate the channel using only a subset of the spatial directions in the beam-space processing. However, determining the optimal subset of beams is non-trivial.

FIG. 1A shows a situation in which a receiving device implements five receiving beams 100a, 100b, 100c, 100d, 100e (collectively, 100). The thick arrow shows the direction of a transmission from a transmitting device. Dashed lines in each of the receiving beams 100 show the received wireless energy in those beams as a result of the transmission by the transmitting device.

In highly directive channel conditions such as line-of-sight (LoS) scenarios, the majority of the channel information is confined to a single beam. This is shown in FIG. 1A, where the wireless energy from the transmitting device comes from a single direction, and the received wireless energy is predominantly in beam 100*d*. A lesser amount of energy is received in beam 100*c*, and very little energy is received in beams 100*a*, 100*b* and 100*e*. A method of channel estimation in which only the energy collected using the strongest beam, i.e., beam 100*d*, therefore achieves reasonable performance, as the vast majority of the channel information is confined to that beam. FIG. 1B shows this method, in which only the wireless energy received using beam 100*d* is utilized for the estimation of the channel, and the energy received in other beams is not used for estimation of the channel (note that the energy received in other beams may still be utilized by the receiving device for other purposes). In fact, methods of channel estimation using only the strongest beam often perform better than methods which combine the channel estimation from all directions, e.g., using minimum mean square error (MMSE) or other methods.

However, in non-line-of-sight (NLoS) scenarios, channel information is typically not confined to a single direction. This is shown in FIG. 2A, which again illustrates a receiving device implementing five receiving beams 200*a*, 200*b*, 200*c*, 200*d*, 200*e* (collectively, 200). In this case, there are multiple thick arrows showing transmissions by a single receiving device, e.g., resulting from reflections, as there is no line-of-sight between the transmitting device and the receiving device. Thus there is also no clear dominant direction in which wireless energy is received; rather, wireless energy is received in both beams 200*b* and 200*d*. A channel estimation method using only the strongest beam 200*d* (as shown in FIG. 2B) therefore discards a large amount of useful information on the channel. In this case, a method which performs channel estimation using information from beams 200*b* and 200*d* (and potentially other beams) performs better than a method which uses only information from only the strongest beam 200*d*.

However, typically the receiving device will not know whether a line of sight exists with the transmitting device, and whether channel estimation should be performed using energy from only the strongest beam or from multiple beams, or from all beams. Typically, a compromise is chosen between these options, in which the x strongest beams are selected for the purposes of channel estimation (where x is an integer greater than one).

One aspect of the disclosure provides a method for estimating a radio channel between a base station and a wireless device. The base station comprises an antenna system which is configurable to utilize beam space processing for receiving radio transmissions. The method comprises: using the antenna system to detect wireless energy from the wireless device in a plurality of beam directions; obtaining historical data relating to a likelihood that wireless energy in the plurality of beam directions contains channel information; selecting a subset of the plurality of beam directions based on the detected wireless energy and the historical data; and processing wireless energy detected in the subset of beam directions to estimate a channel between the base station and the wireless device.

Further aspects of the disclosure provide apparatus and computer-readable mediums for performing the methods set out above and described herein. For example, one such aspect provides a base station for estimating a radio channel between the base station and a wireless device. The base station comprises an antenna system which is configurable to utilize beam space processing for receiving radio transmissions, processing circuitry and a non-transitory computer-readable medium storing instructions which, when executed by the processing circuitry, cause the base station to: use the antenna system to detect wireless energy from the wireless device in a plurality of beam directions; obtain historical data relating to a likelihood that wireless energy in the plurality of beam directions contains channel information; select a subset of the plurality of beam directions based on the detected wireless energy and the historical data; and process wireless energy detected in the subset of beam directions to estimate a channel between the base station and the wireless device.

A further aspect provides a non-transitory computer-readable medium storing instructions which, when executed by processing circuitry of a network node, cause the network node to: use an antenna system of a base station to detect wireless energy from a wireless device in a plurality of beam directions; obtain historical data relating to a likelihood that wireless energy in the plurality of beam directions contains channel information; select a subset of the plurality of beam directions based on the detected wireless energy and the historical data; and process wireless energy detected in the subset of beam directions to estimate a channel between the base station and the wireless device.

As will be described in greater detail below, technical advantages of embodiments of the disclosure include a more accurate, reliable channel estimation procedure, without increasing wireless device power or battery usage. The more accurate channel estimation in turn improves downlink beamforming, providing higher data rates and greater throughput to the wireless device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1B:
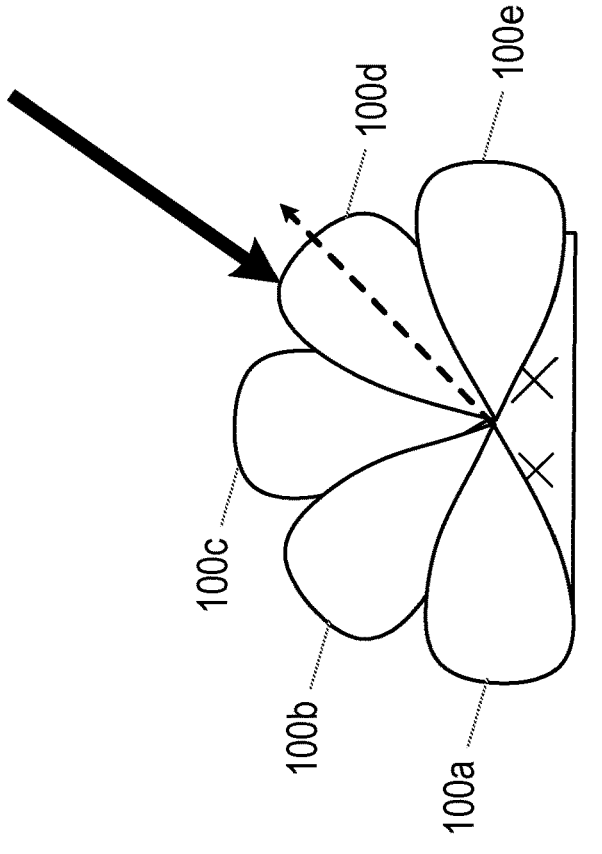
FIGS. 1A and 1B are schematic diagrams showing the reception of wireless energy by one or more receiving beams in a line-of-sight scenario, and the selection of those beams for estimation of the wireless channel.
Figure 1A:
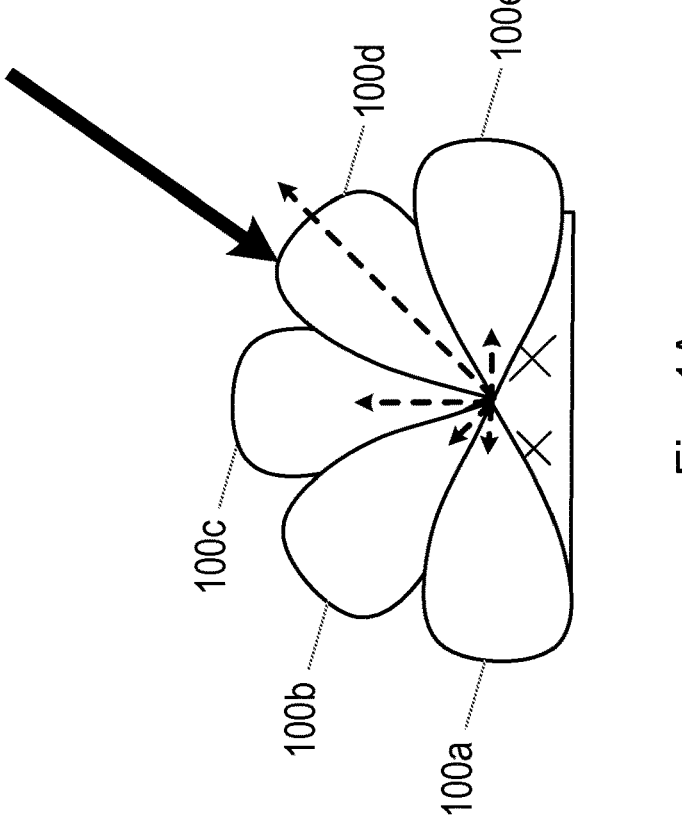
Figure 2B:
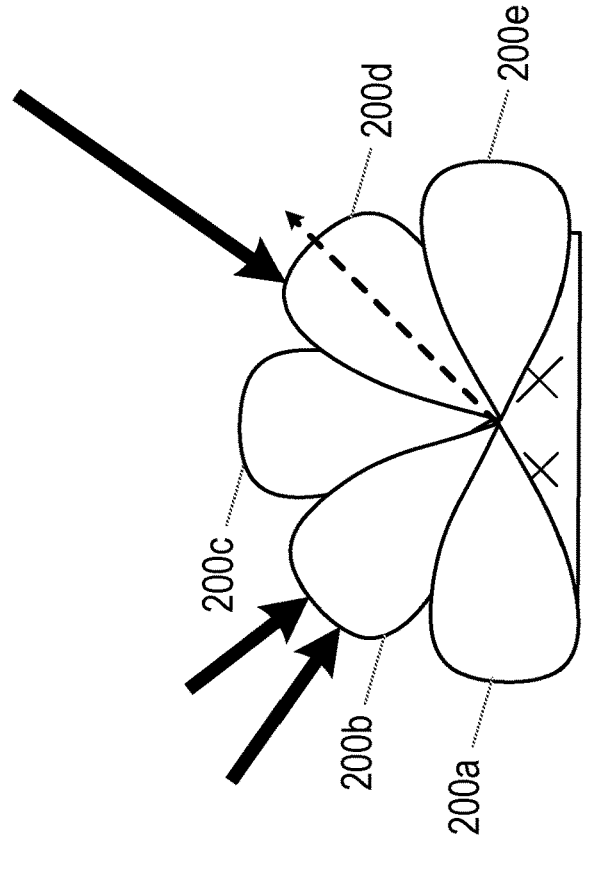
FIGS. 2A and 2B are schematic diagrams showing the reception of wireless energy by one or more receiving beams in a non-line-of-sight scenario, and the selection of those beams for estimation of the wireless channel.
Figure 2A:
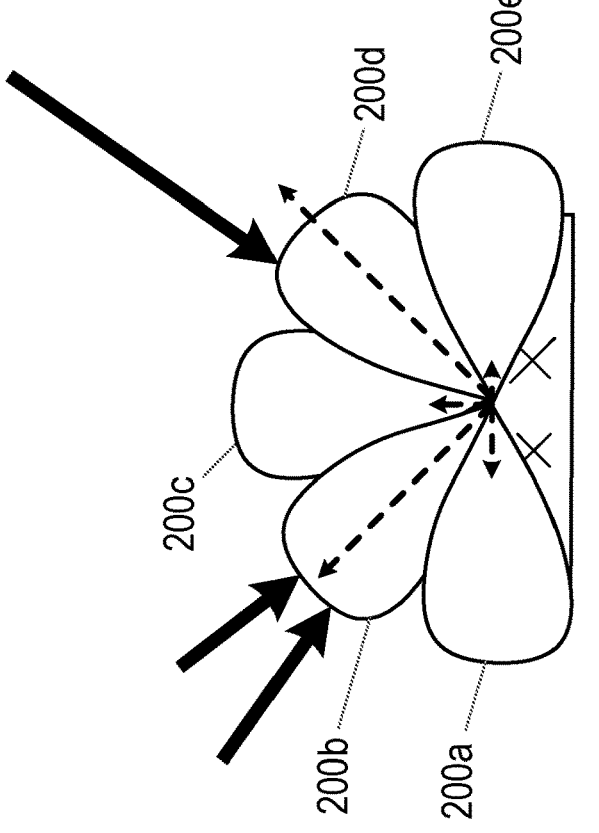
Figure 3:
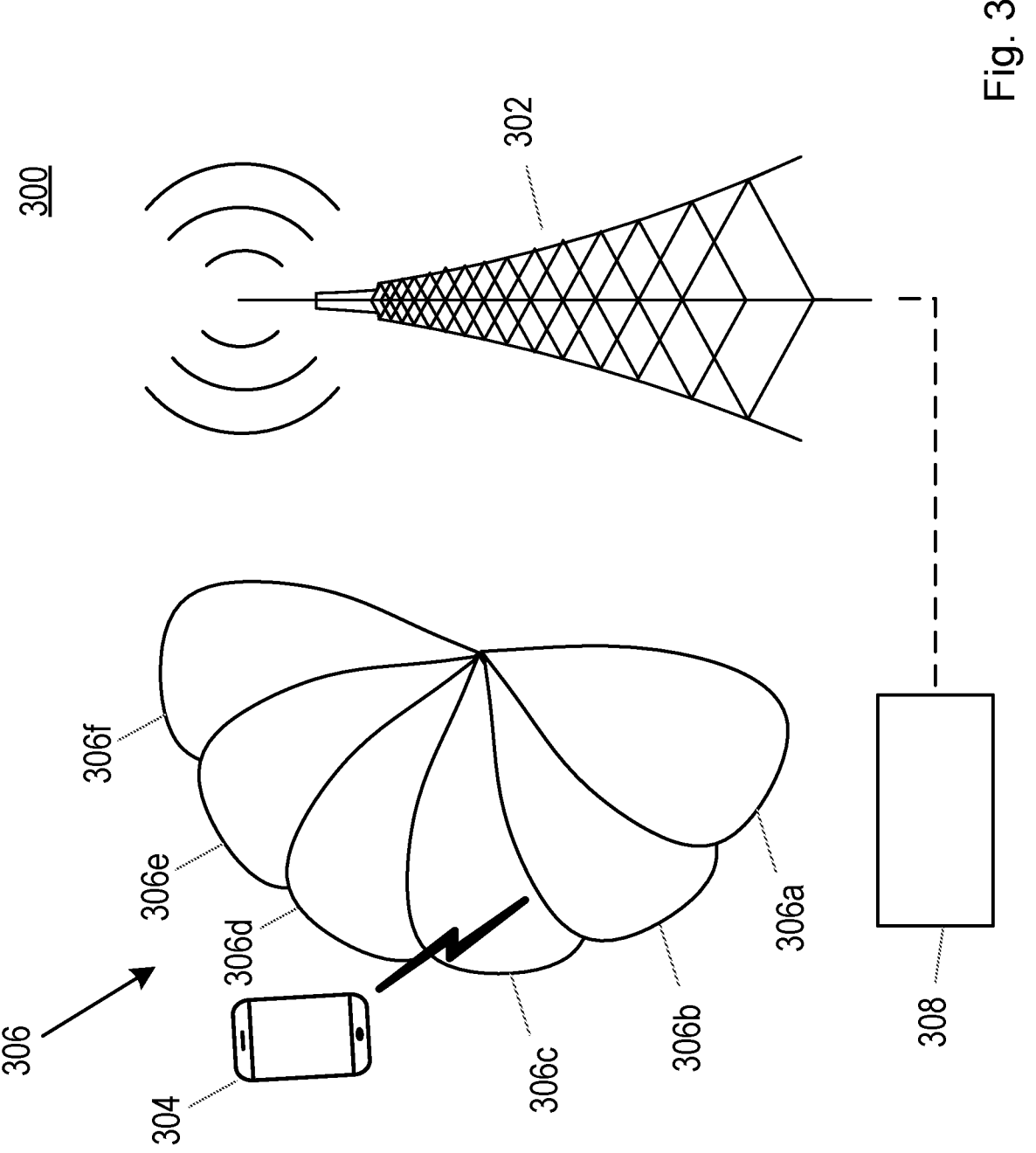
FIG. 3 shows a wireless system according to embodiments of the disclosure.

FIG. 3 is a schematic diagram showing a wireless system 300 according to embodiments of the disclosure. The wireless system 300 may implement any suitable standard or protocol for radio communication.

Thus, the system 300 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/

EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The system 300 may be suitable for providing radio communications meeting one or more of the criteria established by the Next Generation Mobile Networks Alliance for the 5th generation of mobile telecommunications standards. In one embodiment, therefore, the wireless system 300 may form part of a wireless cellular network.

The system 300 comprises a base station 302 and a wireless device 304. The base station 302 may be referred to as e.g. radio access node, NodeB, evolved NodeB (eNB, or eNodeB), gNodeB, base transceiver station, Access Point Base Station, base station router, Radio Base Station (RBS), macro base station, micro base station, pico base station, femto base station, Home eNodeB, relay and/or repeater, beacon device or any other network node configured for communication with wireless devices over a wireless interface, depending e.g. on the radio access technology and terminology used. The functions of the base station 302 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

As used herein, the term "wireless device" refers to a device capable, configured, arranged and/or operable to communicate wirelessly with network nodes and/or other wireless devices. Unless otherwise noted, the term "wireless device" may be used interchangeably herein with user equipment (UE). Examples of wireless devices include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Transmissions between the base station 302 and the wireless device 304 are enhanced using beamforming techniques, and in particular the base station employs an antenna array comprising a plurality of antennas or antenna elements. Signals to or from those antennas may be subject to amplitude and/or phase shifts so as to enhance the signals transmitted in or received from certain directions and to suppress energy transmitted in or received from other directions. The phase and amplitude shifts result in constructive interference between signals transmitted or received by each antenna element in the preferred direction, and destructive interference in other directions.

In this way a plurality of beams 306 are defined with which the base station 302 can receive wireless energy. In the illustrated embodiment, the base station 302 generates six beams 306*a*, 306*b*, 306*c*, 306*d*, 306*e* and 306*f*. Those skilled in the art will appreciate that in general the base station 302 may be able to generate any number of beams greater than one, and typically may be able to generate many more beams than the six shown in FIG. 3. As different beams are generated by altering the amplitude and/or phase shifts applied to each antenna, the number of beams which may be generated by the base station 302 may be limited only by the number of antennas and the granularity with which those amplitude and/or phase shifts can be defined.

As noted above, the base station 302 needs to determine appropriate beamforming parameters for transmission to the wireless device 304 (i.e., downlink transmissions). These beamforming parameters are the set of amplitude and/or phase shifts to apply to the different antennas when transmitting. One approach to this problem is for the wireless device 304 to transmit a known sequence (e.g., sounding reference signals), which are received by the base station 302 and used to estimate the wireless channel between the wireless device 304 and the base station. As noted above, the wireless channel is reciprocal and thus, by adjusting for potential non-reciprocal aspects of the hardware, channel estimates in the uplink can be considered to correspond to channel estimates in the downlink. The information in the channel estimates tells the base station how to spatially distribute the transmit energy, and this is controlled by setting the beamforming parameters accordingly. Thus the uplink channel estimates provide information on how to beamform in the downlink, and can be used to determine the beamforming parameters for downlink transmissions to the wireless device 304. Where the base station 302 utilizes multiple beams 306 to receive the reference signals, as in the illustrated embodiment, a linear combination of all receiver ports may be used to perform the channel estimation and so improve performance. This is known as beam-space processing.

Thus the wireless device 304 transmits reference signals (e.g., sounding reference signals) which are detected by the base station 302 via one or more of the beams 306.

As discussed above with respect to FIGS. 1A, 1B, 2A and 2B, however, the reference signals will be detected more strongly in some beams than in others. The wireless energy collected by each beam 306 will comprise some amount of noise, and may comprise energy resulting from the reference signals transmitted by the wireless device 304. This latter energy provides information on the wireless channel between the wireless device 304 and the base station 302, whereas the noise does not. Some beams 306 may receive no energy resulting from the reference signals transmitted by the wireless device 304.

A beam-space processing method which utilizes wireless energy from only the beam with the strongest received signal (e.g., the highest received power or energy), or the n beams with the strongest received signals, may therefore discard useful energy (i.e., that containing channel information) received by other beams which would enable a better estimation of the channel. A beam-space processing method which utilizes wireless energy from all beams may utilize wireless energy received in beams which contain no or very little energy resulting from the reference signal transmission, i.e., they contain no channel information. In this case, channel estimation performance is reduced by selecting too many beams to be combined, since the superfluous beams contribute only noise to the channel estimation, thereby degrading the estimation quality.

Embodiments of the present disclosure address this problem by utilizing historical data to select a subset of beams from which to estimate the channel. That is, historical data relating to a likelihood of wireless energy in a plurality of beam directions containing channel information is stored and then later utilized to intelligently select only those beams which are likely to have detected wireless energy containing channel information. For example, the base station 302 (or a node in communication with the base station) may store data indicating which beam directions (which of the beams 306) is likely to contain channel information in a given set of circumstances. This historical data is then utilized to select a subset of the plurality of beam directions, and wireless energy detected only in the subset of beam directions is processed to estimate the channel between the base station 302 and the wireless device 304.

The historical data may be obtained through communication between the base station 302 and any wireless devices camped on the cell served by the base station 302. Thus historical data collected from one or more wireless devices in a given set of circumstances (e.g., in a particular geographical location) may be used to select the subset of beams from which to estimate the channel for another wireless device subject to the same set of circumstances (e.g., in the same geographical location). Further, the historical data may be continually collected and updated, reflecting the changing radio environment in which the base station 302 operates.

The historical data may further comprise an association between wireless energy received using the beams 306 and a likelihood that energy in each of the beams contains channel information. For example, the historical data may comprise an indication that, where the strongest signal is received by beam 306d, the best channel estimation is obtained by processing wireless energy received by beams 306b, 306c and 306d (in other words, where beam 306d is the strongest, beams 306b and 306c also contain channel information). This aspect is described in further detail below.

The historical data may be collected by and stored in the base station 302, or collected by the base station 302 and stored in another network node communicatively coupled to the base station 302. Thus, in the illustrated embodiment, the system 300 further comprises a database 308 in communication with the base station 302, which stores the historical data described above. The database 308 may be implemented in any network node or function, or any server which is communicatively coupled to the base station 302.

Figure 4:
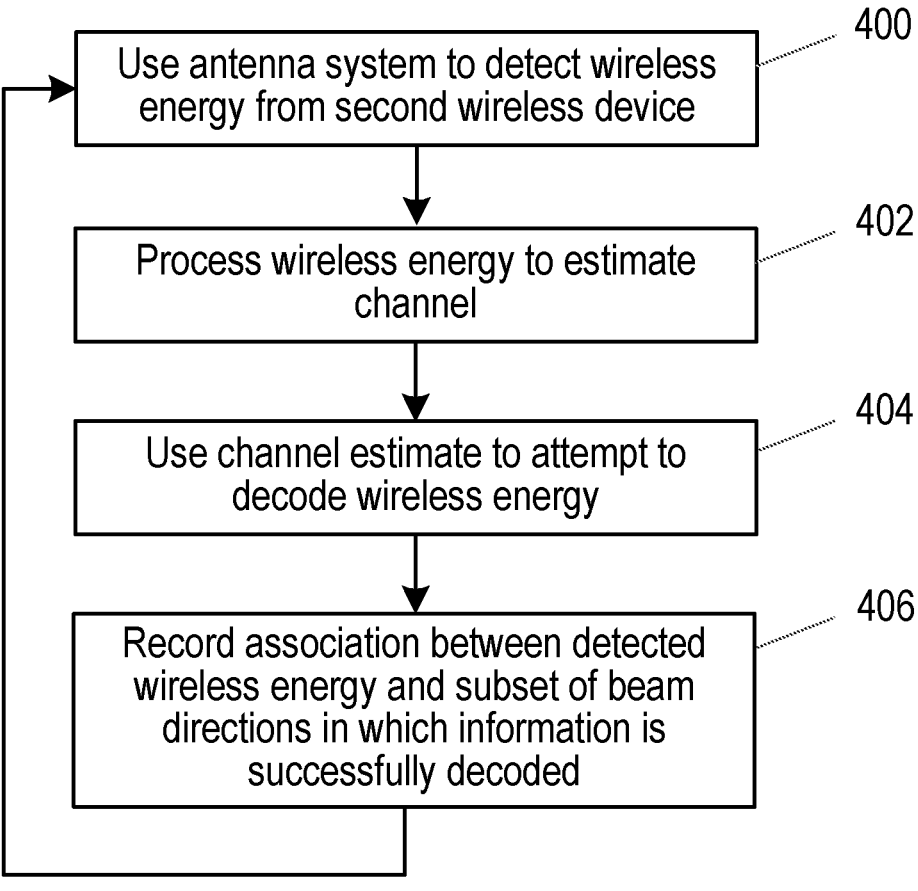
FIG. 4 is a flowchart of a method according to embodiments of the disclosure for recording data relating to a likelihood of wireless energy received in each of a plurality of beam directions containing channel information.

FIG. 4 is a flowchart of a method according to embodiments of the disclosure, for recording historical data relating to a likelihood that wireless energy contains channel information. The method may be performed by a base station or radio access network node, such as the base station 302 described above. The base station 302 comprises an antenna system comprising a plurality of antennas or antenna elements (e.g., arranged in an array), and is therefore capable of utilizing beam space processing to receive signals from wireless devices, as described above, in a plurality of beam directions.

The base station serves multiple wireless devices, and the historical data that is obtained relates to interactions with any one or more (or all) of those multiple wireless devices. These wireless devices are called "second wireless devices" herein, to differentiate them from the first wireless device (e.g., the wireless device 304) for which the historical data is subsequently used to select beam directions (see FIG. 5 for a fuller description of this method).

The method begins in step 400, in which the base station uses its antenna system to detect wireless energy from a second wireless device. Thus, the base station detects wireless energy in a number of different beam directions. Wireless energy may be detected in each of the plurality of beam directions that the antenna system is capable of implementing, or only in some of the beam directions. In the latter case, for example, the base station may be aware of an approximate pointing direction between the second wireless device and the base station, and thus detect wireless energy received in multiple beam directions encompassing that approximate pointing direction.

As noted above, the wireless energy detected in each beam comprises some amount of noise and may also comprise energy transmitted by the second wireless device (e.g., a reference signal or pilot signal such as a sounding reference signal). The energy transmitted by the second wireless device contains some channel information, as the energy has passed through the channel from the second wireless device to the base station, whereas the noise contains no channel information.

In step 402, the base station processes some or all of the wireless energy received in step 400 to estimate the channel between the base station and the second wireless device. Based on its knowledge of the reference signal or pilot signal transmitted by the second wireless device, as well as the received wireless energy, the base station is able to estimate the effect of the wireless channel on the transmission by the second wireless device.

For example, the base station may select the beam direction in which the most wireless energy is detected (e.g., the strongest received power or reference signal received power, RSRP), and process only the wireless energy from that beam direction to estimate the channel. Alternatively, the base station may estimate the channel using wireless energy detected in more than one beam direction. For example, the base station may select the k beams in which the most wireless energy is detected (where k is an integer greater than one). In another example, the base station may utilize the wireless energy detected in all beam directions to estimate the channel. The wireless energy in each beam direction (or "receiver port") may be combined in a linear combination, before being processed to estimate the channel; alternatively, the wireless energy in each beam direction may be processed to estimate the channel, and each corresponding channel estimate combined (e.g., in an average). Numerous techniques for estimating the channel are known to those skilled in the art, and the present disclosure is not limited in this respect. Example techniques include channel estimation in the discrete cosine transform (DCT) domain with tap selection using a technique such as the Akaike information criterion. Further detail on channel estimation in the context of MIMO uplink can be found in a paper by Henrik Sahlin and Anders Persson ("Aspects of MIMO Channel Estimation for LTE Uplink", 2011 IEEE Vehicular Technology Conference).

In step 404, the base station attempts to decode the detected wireless energy in each beam direction using the channel estimate obtained in step 402, e.g., to recover control data, user data, or any other information transmitted by the second wireless device to the base station along with the reference signal or pilot signal used to obtain the channel estimate. In one embodiment, where the detected wireless energy in a particular beam direction is successfully decoded using the beam estimate, it may be assumed that the wireless energy detected in that beam direction comprises some energy transmitted by the second wireless device and thus contains information on the channel between the base station and the second wireless device. Thus the energy detected in the beam direction may have been useful in estimating the channel.

In step 406, an association is recorded between those beam directions in which wireless energy is successfully decoded, and one or more circumstances relating to the detection of the wireless energy in step 400. For example, in one embodiment, the circumstances may comprise one or more characteristics of the wireless energy detected in step 400, such as the beam (or n beams, where n is an integer) in which the most energy is detected. Additionally or alternatively, the one or more characteristics may comprise the amount of energy, in one or more beam directions or in aggregate. In a further alternative or additional embodiment, the one or more characteristics may comprise the power relation between the plurality of beam directions or other beamspace power distribution fingerprint. The one or more circumstances may further additionally or alternatively comprise the context of the second wireless device, such as one or more of a geographical location of the device, a velocity of the device, a UE class of the device, and a current time.

The method of FIG. 4 is repeated many times, for many different devices in different circumstances and with different detected wireless energy. In this way, long-term statistics are collected which enable robust associations to be formed between different levels of detected energy, the circumstances of the second wireless devices, and the beam directions which are likely to contain channel information at the base station. For example, in one embodiment, the data may be averaged over time. In this way, statistics such as the long-term average power will average out the contribution of noise in signal power distribution over space. The data is grouped and stored in accordance with any of these circumstances, enabling relevant data to be retrieved based on any one or more of the circumstances.

Thus the method shown in FIG. 4 collects and stores data relating to a likelihood that wireless energy received in a plurality of different beam directions contains channel information. The data is stored in such a way that associates one or more characteristics of the wireless energy (e.g., the one or more strongest beams, the distribution of the wireless energy across the beams, etc) and/or the circumstances in which the wireless energy is received, with beam directions which are likely to contain channel information. According to the illustrated embodiment, beam directions are indicated as being likely to contain channel information if detected wireless energy is successfully decoded (e.g., in step 404 above). In other embodiments, a beam direction may be indicated as being likely to contain channel information if the signal-to-noise ratio is above a threshold, e.g., such that the channel estimation benefits from inclusion of the wireless energy received in that direction. In yet further embodiments, a beam direction may be indicated as being likely to contain channel information if, historically, channel estimation is improved by virtue of including that beam direction in the beam space processing e.g., a lower bit error rate may be achieved using channel estimates obtained using wireless energy from the particular beam direction.

The method shown in FIG. 4 is one way in which the historical data described herein may be captured and stored. It will be appreciated that other methods for capturing and storing such data may be used as an alternative to the method of FIG. 4 or in addition to the method of FIG. 4.

In one embodiment, a machine learning model may be trained using the data obtained via FIG. 4, to predict the subset of beam directions which are likely to contain channel information in a given set of circumstances. Thus, the data obtained by the method of FIG. 4 may be arranged as labelled training data, with the input features comprising one or more of: the energy detected in each of the beam directions, or a subset of them; an indication of the one or more beam directions in which the most energy was received; the power relation between the plurality of beam directions or other beamspace power distribution fingerprint; the context of the second wireless device, such as one or more of a geographical location of the device, a velocity of the device, a UE class of the device, and a time at which the energy was detected. The labels for the input features are the subset of beam directions in which channel information was detected. Thus the machine learning model may be trained to generate the output (i.e., the label) based on the input data. Any suitable machine learning model may be used for this purpose, such as a neural network for example.

Figure 5:
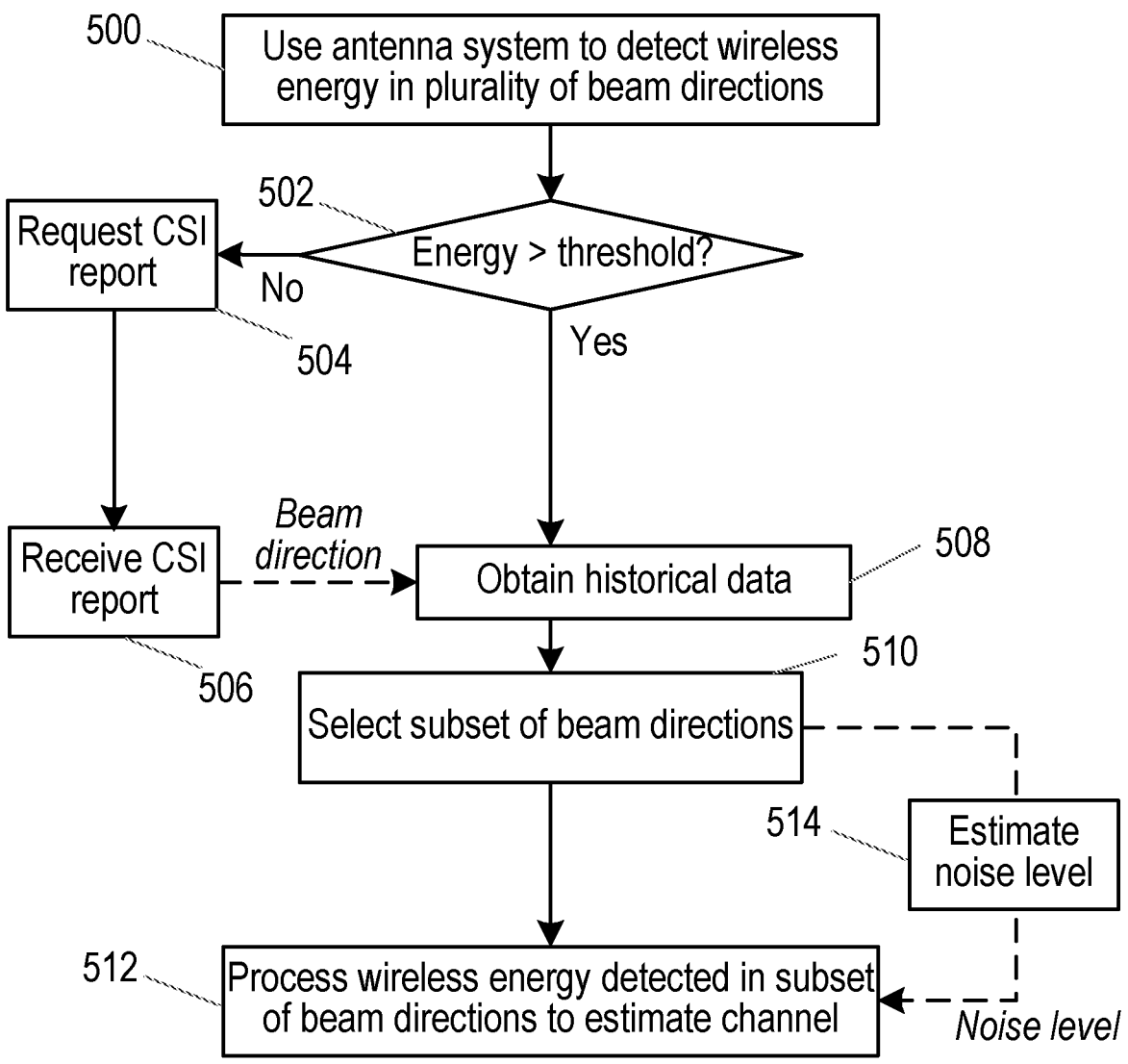
FIG. 5 is a flowchart of a method according to embodiments of the disclosure for estimating a channel between a base station and a wireless device.

FIG. 5 is a flowchart of a method according to embodiments of the disclosure. The method may be performed by a base station, such as the base station 302 described above with respect to FIG. 3. The method may also be performed in conjunction with the method described above with respect to FIG. 4. In particular, FIG. 4 describes a method for collecting historical data relating to the likelihood that wireless energy collected in a plurality of beam directions will contain channel information. FIG. 5 describes a method in which that historical data is used to select a subset of beam directions in which to process wireless energy to obtain a channel estimate.

The method begins in step 500, in which the base station uses its antenna system to detect wireless energy from a first wireless device. Thus, the base station detects wireless energy in a number of different beam directions. Wireless energy may be detected in each of the plurality of beam directions that the antenna system is capable of implementing, or only in some of the beam directions. In the latter case, for example, the base station may be aware of an approximate pointing direction between the first wireless device and the base station, and thus detect wireless energy received in multiple beam directions encompassing that approximate pointing direction. Alternatively, the base station may opt to detect wireless energy in only a subset of the beams covering a sufficient range of different directions.

As noted above, the wireless energy detected in each beam comprises some amount of noise and may also comprise energy transmitted by the second wireless device (e.g., a reference signal or pilot signal such as a sounding reference signal). The energy transmitted by the first wireless device contains some channel information, as the energy has passed through the channel from the first wireless device to the base station, whereas the noise contains no channel information.

In step 502, the base station compares an amount of energy received in step 500 to a threshold. For example, the total amount of energy received in all beam directions may be compared to the threshold. Alternatively, the respective amounts of energy received in each direction may be compared to a threshold.

If the amount of energy received in step 500 is above the threshold, the method proceeds to step 508, in which the base station obtains historical data relating to the likelihood of the energy received in step 500 in the different beam directions containing information on the channel between the first wireless device and the base station. Thus, the base station obtains historical data such as may have been collected according to the method described above with respect to FIG. 4. The historical data may be obtained or selected based on the groupings, set of circumstances or other data relationships with which the historical data was collected.

In one embodiment, the historical data is selected based on one or more characteristics of the energy received in step 500. For example, the base station may determine the beam direction (or the n beam directions, where n is an integer equal to or greater than one) in which the most energy was collected, and provide that beam direction (or those beam directions) as an input to determine which beam directions should be selected to be processed for estimation of the channel. The historical data contains associations between the strongest beam(s) and the subset of beam directions which are likely to contain channel information. Thus the historical data in this instance may be used to select the subset of beam directions which have previously contained channel information when the particular beam(s) are strongest. Additionally or alternatively, the base station may provide the amount of energy, in one or more beam directions or in aggregate, as an input to obtaining the historical data. In a further alternative or additional embodiment, the base station may use the power relation between the plurality of beam directions or other beamspace power distribution fingerprint as an input to obtaining historical data.

The historical data may thus comprise sets of input data including circumstances such as the beam energy characteristics noted above (e.g., the strongest beam(s), other beam distribution information, etc), and corresponding subsets of beam directions which, in those same circumstances, historically contained channel information.

In further embodiments of the disclosure, the sets of input data may comprise additional information to the beam energy characteristics. In one embodiment, the sets of input data may comprise information relating to the context of the wireless device. For example, the geographical location of the first wireless device, the velocity of the first wireless device, the UE class of the first wireless device, and/or the time may additionally or alternatively be used as inputs to select the historical data as to which beam directions are likely to contain channel information. The geographical location of the first wireless device may help to distinguish between situations in which wireless devices have the same line-of-sight with the base station, but are at different distances from the base station. The velocity of the first wireless device may be a relevant factor in determining the beam directions which are most likely to contain channel information, by providing additional data on device location. For example, two devices in a similar geographical location may nonetheless be distinguished based on their velocity, as a device on a road or a railway (e.g. moving quickly) as opposed to a device near to a road or railway (e.g., moving slowly). The UE class may be relevant, for example, in determining the maximum transmit power of the first wireless device, with wireless energy more likely to be received in a greater number of beam directions from a more powerful wireless device. The time (e.g., the time of day, the day of the week, the time of the year, etc) may be relevant in determining the radio environment in which the first wireless device is located. For example, a device transmitting in or near a road during rush hour may experience a greater number of reflections than another device at the same location outside rush hour.

Where a predictive model has been trained to predict the subset of beam directions which are likely to contain channel information, one or more of these parameters (e.g., one or more of: the energy detected in each of the beam directions, or a subset of them; an indication of the one or more beam directions in which the most energy was received; the power relation between the plurality of beam directions or other beamspace power distribution fingerprint; the context of the second wireless device, such as one or more of a geographical location of the device, a velocity of the device, a UE class of the device, and a time at which the energy was detected) may be provided as an input to the model, which outputs a subset of the beam directions which are predicted to contain channel information.

Thus the base station obtains historical data, based on the beam energy characteristics of the energy detected in step 500 and potentially additional criteria, indicating a subset of beam directions which are likely to obtain channel information.

If it is determined in step 502 that the amount of energy is too low for the base station to make a robust initial assessment of the main beam direction (e.g., the total amount of energy is below the threshold, or the respective amounts of energy are all below the threshold), the method proceeds to step 504. In this step, the base station requests that the first wireless device provide further feedback information so that the main beam direction can be determined. For example, in the illustrated embodiment, the base station requests that the wireless device report CSI information to the base station. For example, the wireless device may be requested or configured to transmit an aperiodic report message (e.g., a CSI report such as a type I report), based on one or more reference signals transmitted by the base station in each beam direction (e.g., CSI reference signals (CSI-RS), synchronization signal blocks (SSB), etc). The report message is then received in step 506, and comprises an indication of the beam between the first wireless device and the base station which was associated with the strongest received reference signal (e.g., the strongest RSRP at the first wireless device). This information may then be used as an input to select historical data in step 508.

In step 510, the base station selects a subset of the beam directions for channel estimation based on the energy received in step 500 and the historical information obtained in step 508. In one embodiment, the base station may select the strongest beam (i.e., the beam direction in which most wireless energy is received), plus one or more additional beam directions based on the historical data. For example, the base station may select the strongest beam direction and each of the beam directions recommended by the historical data.

In step 512, the base station processes the wireless energy detected in each of the subset of beam directions to estimate the channel between the base station and the first wireless device. As noted above with respect to step 402, this process will be well known to those skilled in the art. For example, the wireless energy in each beam direction in the subset may be combined in a linear combination, before being processed to estimate the channel; alternatively, the wireless energy in each beam direction in the subset may be processed to estimate the channel, and each corresponding channel estimate combined (e.g., in an average). Numerous techniques for estimating the channel are known to those skilled in the art, and the present disclosure is not limited in this respect. Example techniques include least-squares estimation and minimum mean square error (MMSE).

One additional input that may be useful in estimating the channel is an estimate of the noise floor. As noted above, the energy that is detected in each beam direction comprises some noise, and may comprise some energy transmitted by the first wireless device. The historical data is used as described above to select the subset of beam directions which are likely to contain channel information (i.e., at least some energy transmitted by the first wireless device). However, the energy detected in the subset of beam directions will also comprise some noise, which should be removed for an accurate estimate of the channel to be determined.

In one embodiment, the historical data obtained in step 508 is additionally used to determine one or more beam directions which are likely to comprise no channel information, i.e., the beam directions are likely to contain only noise, and no energy transmitted by the first wireless device. For example, the historical data may indicate a beam direction which is vertically upwards, or some other direction which is very likely to comprise only noise. This direction could be selected as one single direction for any subset of beams to process, or a specific direction for each subset that statistically has shown to contain nothing but noise. In step 514, the energy detected in these one or more beam directions (in step 500) is used to estimate the noise level (e.g., the energy is used as an estimate of the noise level). The estimate of the noise level may then be used as an input to the channel estimation in step 512.

The present disclosure therefore provides methods for performing channel estimation in a base station or other radio access network node utilizing beam space processing techniques to detect wireless energy in a plurality of beam directions. The wireless energy detected in each beam direction will comprise some amount of noise, and may comprise channel information (e.g., energy transmitted by a wireless device). The method utilizes historical data (e.g., statistics, rules and associations derived from those statistics, etc) relating to a likelihood of wireless energy in each beam direction containing channel information to select a subset of the plurality of beam directions. Wireless energy received only in the subset of beam directions is then processed to estimate the channel between the base station and a wireless device. The channel estimate may subsequently be used to decode data transmitted by the wireless device to the base station, and/or to determine suitable beamforming parameters for subsequent transmissions from the base station to the wireless device (based on the assumption of channel reciprocity). In this way, the accuracy of channel estimation can be expected to improve, as only those beam directions which have historically been found to contain channel information may be used for the estimation of the channel. Beam directions which contain no or little channel information (and which would otherwise degrade the channel estimate) may not be used for the estimation of the channel.

The disclosure also provides machine-readable mediums (e.g., computer programs, computer program products, etc) and apparatus for performing the methods described above.

Figure 6:
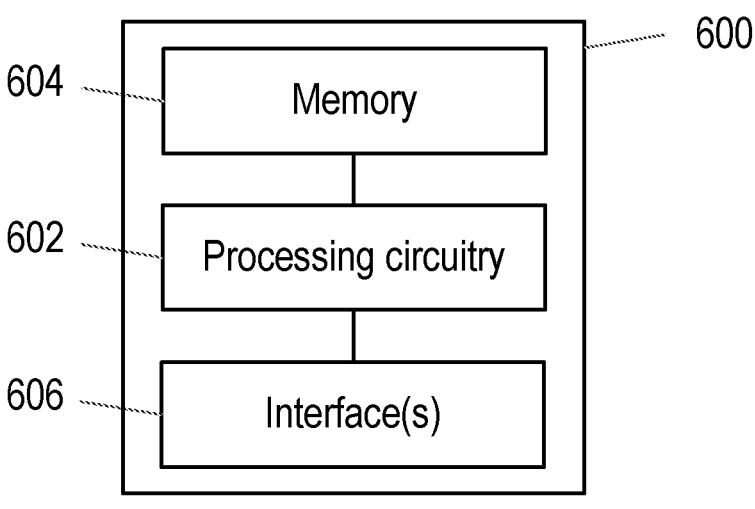
FIGS. 6 and 7 are schematic diagrams showing base stations according to embodiments of the disclosure.

FIG. 6 is a schematic diagram of a network node 600 according to embodiments of the disclosure.

The network node 600 may be configured to implement the methods described above with respect to FIGS. 4 and 5, for example. The network node 600 may comprise or be implemented in a base station or a radio access network node (such as the base station 302) of a wireless communications network. The base station comprises an antenna system which is configurable to utilize beam space processing for receiving radio transmissions.

The network node 600 comprises processing circuitry (such as one or more processors) 602 and a non-transitory machine-readable medium 604 (such as memory). The memory may store instructions which, when executed by the processing circuitry 602, cause the network node to: use the antenna system to detect wireless energy from the wireless device in a plurality of beam directions; obtain historical data relating to a likelihood that wireless energy in the plurality of beam directions contains channel information; select a subset of the plurality of beam directions based on the detected wireless energy and the historical data; and process wireless energy detected in the subset of beam directions to estimate a channel between the base station and the wireless device.

The network node 600 may further comprise one or more interfaces 606, for transmitting signals to and/or receiving signals from other network nodes of the wireless communications network. The interfaces 606 may comprise circuitry for the transmission and/or reception of electrical, optical or wireless signals.

The interface(s) 606, processing circuitry 602 and machine-readable medium 604 may be connected together in any suitable manner. In the illustrated embodiment, the components are coupled together directly, in series. In alternative embodiments, the components may be coupled to each other via a system bus or other communication line.

Figure 7:
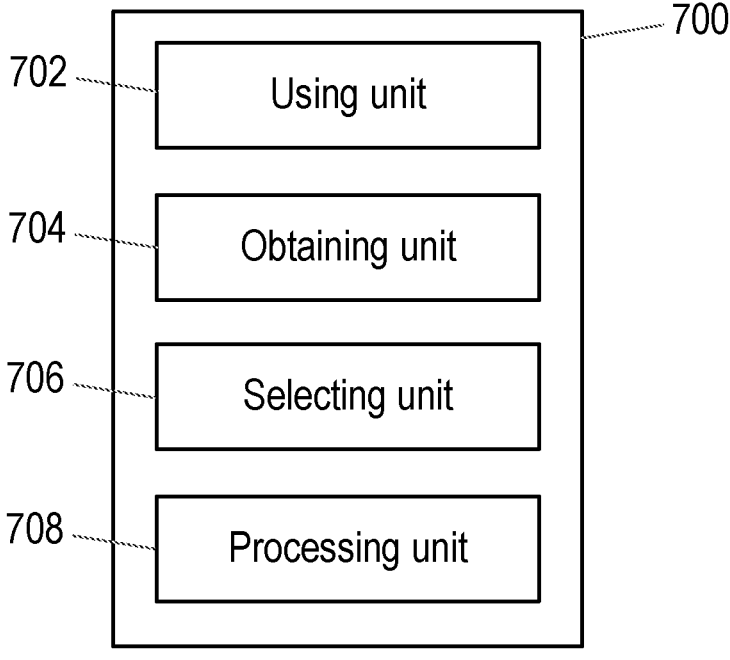

FIG. 7 is a schematic diagram of a network node 700 according to further embodiments of the disclosure.

The network node 600 may be configured to implement the methods described above with respect to FIGS. 4 and 5, for example. The network node 600 may comprise or be implemented in a base station or a radio access network node (such as the base station 302) of a wireless communications network. The base station comprises an antenna system which is configurable to utilize beam space processing for receiving radio transmissions.

The network node 700 comprises a using unit 702, an obtaining unit 704, a selecting unit 706 and a processing unit 708. The using unit 702 is configured to use the antenna system to detect wireless energy from the wireless device in a plurality of beam directions. The obtaining unit 704 is configured to obtain historical data relating to a likelihood that wireless energy in the plurality of beam directions contains channel information. The selecting unit 706 is configured to select a subset of the plurality of beam directions based on the detected wireless energy and the historical data. The processing unit 708 is configured to process wireless energy detected in the subset of beam directions to estimate a channel between the base station and the wireless device.

The network node 700 may further comprise one or more interface modules, for transmitting signals to and/or receiving signals from other network nodes of the wireless communications network. The interface modules may comprise circuitry for the transmission and/or reception of electrical, optical or wireless signals.

In one embodiment, the modules of the network node 700 are implemented purely in software. In another embodiment, the modules of the network node 700 are implemented purely in hardware. In a further embodiment, the modules of the network 700 are implemented in a combination of hardware and software.

Thus the disclosure provides methods, apparatus and machine-readable mediums for estimating the wireless channel between a base station and a wireless device. In particular, the disclosure provides a mechanism for storing and utilizing historical data relating to the likelihood of wireless energy received in certain beam directions containing channel information. This historical data is used to select a subset of the available beam directions, with wireless energy received in the subset of beam directions being processed to estimate the channel.

It should be noted that the above-mentioned embodiments illustrate rather than limit the concepts disclosed herein, and that those skilled in the art will be able to design many alternative embodiments without departing from the scope of the appended following statements and claims. The word "comprising" does not exclude the presence of elements or steps other than those listed in a statement or claim, "a" or "an" does not exclude a plurality, and a single processor or other unit may fulfil the functions of several units recited in the statements. Any reference signs in the statements and claims shall not be construed so as to limit their scope.

The invention claimed is:

1. A method for estimating a radio channel between a base station and a wireless device, the base station comprising an antenna system which is configurable to utilize beam space processing for receiving radio transmissions, the method comprising:

using the antenna system to detect wireless energy from the wireless device in a plurality of beam directions;

obtaining historical data relating to a likelihood that wireless energy in the plurality of beam directions contains channel information;

selecting a subset of the plurality of beam directions based on the detected wireless energy and the historical data; and processing wireless energy detected in the subset of beam directions to estimate a channel between the base station and the wireless device.

2. The method according to claim 1, wherein the historical data comprises associations between sets of input data comprising respective amounts of detected wireless energy from a wireless device in the plurality of beam directions, and corresponding subsets of the plurality of beam directions which are likely to contain channel information.

3. The method according to claim 2, wherein each set of input data further comprises one or more of: a geographical location of the wireless device; a mobility of the wireless device; a class of the wireless device; and a current time.

4. The method according to claim 2, wherein selecting a subset of the plurality of beam directions based on the detected wireless energy and the historical data comprises comparing the detected wireless energy to the sets of input data in the historical data, and selecting an associated subset of beam directions based on the comparison.

5. The method according to claim 1, wherein the historical data comprises a predictive model trained to predict the subset of beam directions based on input data comprising the detected wireless energy from the wireless device.

6. The method according to claim 5, wherein the input data further comprises one or more of: a geographical location of the wireless device; a mobility of the wireless device; a class of the wireless device; and a current time.

7. The method according to claim 1, wherein selecting the subset of the plurality of beam directions based on the detected wireless energy and the historical data comprises selecting one or more of the plurality of beam directions based on the detected wireless energy, and selecting the subset of the plurality of beam directions based on the one or more beam directions and the historical data.

8. The method according to claim 1, wherein the historical data comprises an indication of one or more beam directions which are not likely to contain channel information, and wherein the method further comprises:

estimating a noise level using wireless energy detected in the one or more beam directions which are not likely to contain channel information; and using the estimated noise level when processing wireless energy detected in the subset of beam directions to estimate the channel between the base station and the wireless device.

9. The method according to claim 1, further comprising receiving a report message from the wireless device indicating a first beam direction of the plurality of beam directions, and wherein the subset of the plurality of beam directions is further selected based on the first beam direction.

10. The method according to claim 9, further comprising, responsive to a determination that the wireless energy detected in the plurality of beam directions is below a threshold, transmitting a request to the wireless device for the wireless device to report channel state information.

11. The method according to claim 1, wherein obtaining historical data comprises communicating with a remote network node to obtain the historical data.

12. The method according to claim 1, further comprising generating the historical data by, for each of a plurality of second wireless devices:

using the antenna system to detect wireless energy from a second wireless device in a plurality of beam directions;

processing at least some of the wireless energy to estimate a channel between the base station and the second wireless device;

using the channel estimate to attempt to decode the wireless energy detected in the plurality of beam directions; and recording an association between the detected wireless energy from the second wireless device in the plurality of beam directions and a subset of the plurality of beam directions in which information is successfully decoded.

13. A base station for estimating a radio channel between the base station and a wireless device, the base station comprising an antenna system which is configurable to utilize beam space processing for receiving radio transmissions, processing circuitry and a non-transitory computer-readable medium storing instructions which, when executed by the processing circuitry, cause the base station to:

use the antenna system to detect wireless energy from the wireless device in a plurality of beam directions;

obtain historical data relating to a likelihood that wireless energy in the plurality of beam directions contains channel information;

select a subset of the plurality of beam directions based on the detected wireless energy and the historical data; and process wireless energy detected in the subset of beam directions to estimate a channel between the base station and the wireless device.

14. The base station according to claim 13, wherein the historical data comprises associations between sets of input data comprising respective amounts of detected wireless energy from a wireless device in the plurality of beam directions, and corresponding subsets of the plurality of beam directions which are likely to contain channel information.

15. A non-transitory computer-readable medium storing instructions which, when executed by processing circuitry of a network node, cause the network node to:

use an antenna system of a base station to detect wireless energy from a wireless device in a plurality of beam directions;

obtain historical data relating to a likelihood that wireless energy in the plurality of beam directions contains channel information;

select a subset of the plurality of beam directions based on the detected wireless energy and the historical data; and process wireless energy detected in the subset of beam directions to estimate a channel between the base station and the wireless device.

\* \* \* \* \*